（12）United States Patent
Slattery et al.

(10) Patent No.: US 7,841,504 B2
(45) Date of Patent: Nov. 30, 2010

(54) APPARATUS AND SYSTEM FOR WELDING SELF-FIXTURED PREFORMS AND ASSOCIATED METHOD

(75) Inventors: Kevin T. Slattery, St. Charles, MO (US); Christopher H. Swallow, Rolla, MO (US)

(73) Assignee: The Boeing Company, Chicago, IL (US)

( * ) Notice: Subject to any disclaimer, the term of this patent is extended or adjusted under 35 U.S.C. 154(b) by 1073 days.

(21) Appl. No.: 10/946,267

(22) Filed: Sep. 21, 2004

(65) Prior Publication Data

US 2006/0060635 A1    Mar. 23, 2006

(51) Int. Cl.
*B23K 20/12*    (2006.01)
(52) U.S. Cl. .................. 228/2.1; 228/112.1; 228/44.3; 228/212; 228/114.5
(58) Field of Classification Search ............... 228/112.1, 228/2.1, 44.3, 44.5, 212, 213, 114.5, 2.3; 156/73.5
See application file for complete search history.

(56) References Cited

U.S. PATENT DOCUMENTS

| | | | | |
|---|---|---|---|---|
| 4,960,973 A | * | 10/1990 | Fouche et al. .......... | 219/121.64 |
| 5,492,264 A | * | 2/1996 | Wadleigh ................. | 228/112.1 |
| 6,219,916 B1 | * | 4/2001 | Walker et al. ............ | 29/889.21 |
| 6,264,088 B1 | * | 7/2001 | Larsson .................... | 228/2.1 |
| 6,302,315 B1 | * | 10/2001 | Thompson ............... | 228/112.1 |
| 6,386,428 B2 | * | 5/2002 | Claxton ..................... | 228/175 |
| 6,474,533 B1 | * | 11/2002 | Ezumi et al. ............. | 228/112.1 |
| 6,543,671 B2 | * | 4/2003 | Hatten et al. ............. | 228/112.1 |
| 6,604,667 B2 | * | 8/2003 | Schilling et al. ......... | 228/2.1 |
| 6,786,388 B2 | * | 9/2004 | Ezumi et al. ............. | 228/112.1 |
| 6,840,426 B2 | * | 1/2005 | Aota et al. ................ | 228/112.1 |
| 7,121,448 B2 | * | 10/2006 | Subramanian et al. ....... | 228/2.1 |

FOREIGN PATENT DOCUMENTS

JP    11342481    * 12/1999

* cited by examiner

*Primary Examiner*—Roy King
*Assistant Examiner*—Michael Aboagye
(74) *Attorney, Agent, or Firm*—Alston & Bird LLP

(57) ABSTRACT

An assembly for positioning a structural assembly for friction stir welding, and a system and method for friction stir welding the structural assembly are provided. The assembly includes a substrate defining a recessed pattern therein, and at least one structural member positioned within the recessed pattern to at least partially secure the structural member therein. The structural member is positioned adjacent to the substrate and within the recessed pattern such that the substrate and structural member are formed of materials capable of being friction stir welded together.

17 Claims, 8 Drawing Sheets

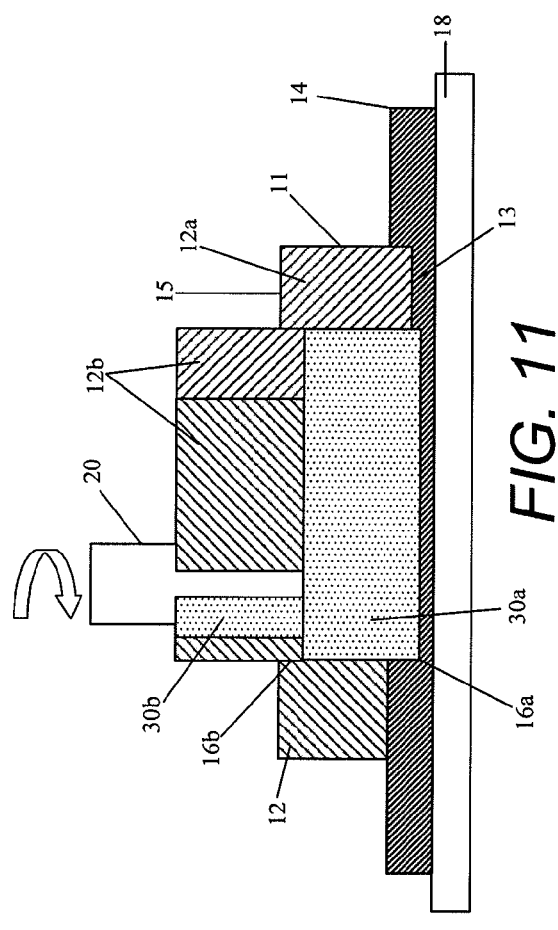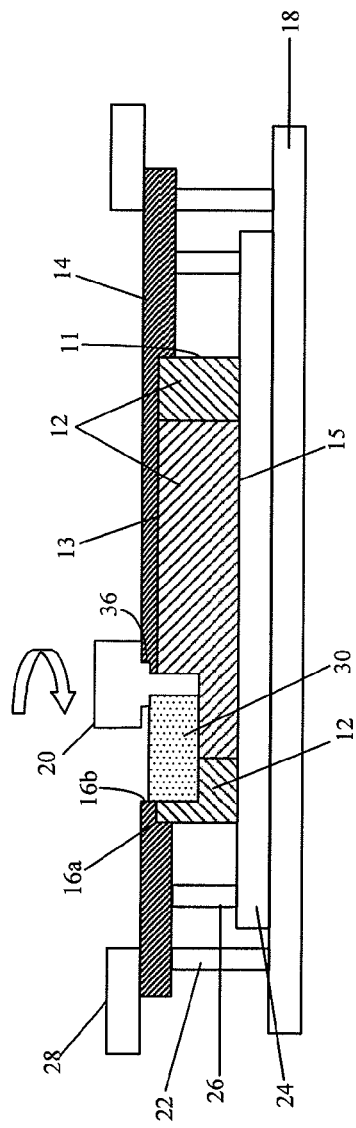

APPARATUS AND SYSTEM FOR WELDING SELF-FIXTURED PREFORMS AND ASSOCIATED METHOD

BACKGROUND OF THE INVENTION

1) Field of the Invention

The present invention relates to friction stir welding and, more particularly, to positioning a structural assembly for friction stir welding and friction stir welding the structural assembly to form a preform.

2) Description of Related Art

Friction stir welding is a process in which a rotating tool, such as a pin or probe, is urged into and/or through a workpiece, e.g., to join multiple members of the workpiece in a solid state or to repair cracks in a workpiece. Typically, the pin extends from a shoulder, which can be flat, concave, or otherwise contoured, and the shoulder is urged against the workpiece so that the pin is urged therein. The pin is then urged through the workpiece to form a continuous weld joint. For example, during one conventional friction stir welding process, the probe of the rotating tool is plunged into a workpiece or between two workpieces by a friction stir welding machine to produce the required resistance force to generate sufficient frictional heating to form a region of plasticized material. The tool can be tilted approximately 3° relative to the workpiece such that the trailing edge of the shoulder is thrust into and consolidates the plasticized material. Upon solidification of the plasticized material, the members of the workpiece are joined along the weld joint. The magnitude of force exerted by the friction stir welding tool must be maintained above a prescribed minimum in order to generate the required frictional heating. Friction stir welding is further described in U.S. Pat. No. 5,460,317 to Thomas et al., the contents of which are incorporated herein by reference.

Friction stir welding has been demonstrated to be a successful joining method for forming certain types of joints, such as the butt joint where the probe is inserted between abutting edges of two structural members, or a lap joint in which the probe is inserted in a direction substantially perpendicular to the interface between overlapping structural members. In addition, other types of friction welding have also been shown to be useful for forming certain joints.

Methods have also been used to friction stir weld preforms. One method includes inserting the probe through a structural member to one side of a center web substrate. Structural members are then added to the opposed second side of the substrate by turning the part over and inserting the probe through the additional structural members and into the substrate to weld the entire structure together. A second method involves welding the structural member to the substrate by inserting the probe through the substrate and into the underlying structural member. A second structural member is stacked on top of the substrate (opposite the previously welded structural member), and the probe is inserted through the second structural member and into the substrate to weld the structure together. Both methods require that each structural member be separately clamped for welding, which is expensive and time consuming. In addition, the second method does not address friction stir welding fully within the structural member.

It would therefore be advantageous to provide a system for friction stir welding preforms that is relatively inexpensive and effective. It would also be advantageous to provide an assembly to secure structures having various sizes during friction stir welding of preforms. It would further be advantageous to provide an assembly that promotes efficient assembly and disassembly before and after friction stir welding the structures into a preform.

BRIEF SUMMARY OF THE INVENTION

The invention addresses the above needs and achieves other advantages by providing an assembly for positioning a structural assembly for friction stir welding preforms, as well as an associated system and method for friction stir welding preforms. The structural assembly is capable of being arranged in a variety of configurations to secure the structural members during friction stir welding, to create various preforms, and to promote efficient assembly before friction stir welding and disassembly after welding.

In one embodiment of the present invention an assembly for positioning a structural assembly for friction stir welding is provided. The assembly includes a substrate defining a recessed pattern therein, and at least one structural member positioned within the recessed pattern to at least partially secure the structural member therein. The recessed pattern may substantially correspond to a width and length of the structural member and extend partially within the substrate to a predetermined depth. The structural member is positioned adjacent to the substrate and within the recessed pattern such that the substrate and structural member are formed of materials capable of being friction stir welded together, such as with a lap or butt joint.

In various embodiments of the present invention, the substrate includes a first surface and a second surface opposite the first surface, wherein the recessed pattern is defined in the first surface. A recessed pattern may be defined in each of the first and second surfaces of the substrate, and at least one structural member positioned within the recessed pattern defined in the second surface. The structural member may be positioned adjacent to the substrate to define an interface between the structural member and a portion of the substrate. At least one support pin may be positioned adjacent and substantially perpendicular to the substrate at a location other than the interface. A plurality of structural members may be positioned adjacent to one another within the recessed pattern to define an interface therebetween, wherein the interface defined between the structural members and the substrate is substantially perpendicular to the interface defined between the structural members. At least one plug weld may be positioned within a respective hole defined along the interface between the structural members and through the interface defined between the structural members and the substrate. Further, the assembly may also include a vacuum source that is capable of drawing a vacuum through a vacuum plate to secure the substrate to the structural member.

In an additional embodiment of the present invention, a system for friction stir welding is provided. The system includes an assembly as described above, as well as a probe operable to penetrate an interface defined between the substrate and the structural member to friction stir weld the substrate and structural member together. The probe may be oriented substantially perpendicular to the interface, and the probe is capable of reciprocating and generating a force substantially perpendicular to the interface such that the structural member is secured within the recessed pattern. Further, the probe may include a shoulder capable of forming a recessed pattern in the structural member on a first surface while the probe friction stir welds the structural member to the substrate on an opposite surface. In addition, the shoulder may be retractable and the probe capable of friction stir welding at least one structural member positioned within the recessed pattern defined in the first surface of the structural member to the first surface.

The present invention also provides a method for friction stir welding. The method includes providing a substrate defining a recessed pattern therein, and positioning at least one structural member within the recessed pattern to at least partially secure the structural member therein. The structural member is positioned adjacent to at least a portion of the substrate to define an interface therebetween, and the method also includes urging a probe through the interface (e.g., substantially perpendicular to the interface) to friction stir weld the substrate and structural member together. The probe may form one of a lap and butt joint between the substrate and the structural member.

In additional aspects of the method, the method includes positioning at least one structural member within a recessed pattern defined on an opposite surface of the substrate and thereafter urging the reciprocating probe through the interface defined between the opposite surface of the substrate and the at least one structural member such that a structural member is capable of being friction stir welded to the opposite surface of the substrate. The method could also include positioning at least one support pin adjacent to the substrate, wherein the support pin is positioned adjacent and substantially perpendicular to the substrate at a location other than the interface. The method may also include positioning a plurality of structural members within the recessed pattern and adjacent to one another to define an interface therebetween, wherein the interface defined between the structural members and the substrate is substantially perpendicular to the interface defined between the structural members. At least one plug weld may be positioned within a respective hole defined along the interface between the structural members and through the interface defined between the structural members and the substrate. Further, the method may include applying a vacuum through a vacuum plate to secure the substrate to the structural member. The method may also include forming a recessed pattern in the structural member on a first surface with a shoulder extending from the probe while the probe friction stir welds the structural member to the substrate on an opposite surface. The method could include retracting the shoulder following forming the recessed pattern in the structural member on a first surface, as well as positioning at least one structural member within the recessed pattern defined in the first surface of the structural member and thereafter urging the reciprocating probe through an interface defined between the first surface and the at least one structural member such that a structural member is capable of being friction stir welded to the first surface.

The present invention therefore provides an assembly that is capable of arranging structural members in a variety of configurations prior to friction stir welding. The assembly eliminates separate tooling for clamping each of the structural members prior to friction stir welding, which consequently reduces the cost of friction stir welding preforms. The recessed pattern, in combination with the force applied by a probe, is capable of adequately securing the structural members during friction stir welding. Furthermore, the assembly is capable of positioning the structural members for fabricating a variety of preforms that may later be machined into a finished part.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 11 is a cross-sectional view of a structural assembly including a structural member positioned within the recessed pattern formed with the probe shown in FIGS. 9 and 10 according to one embodiment of the present invention;

FIG. 12 is a cross-sectional view of a structural assembly for friction stir welding illustrating a probe capable of friction stir welding and forming a recess in a substrate according to one embodiment of the present invention;

Figure 13:
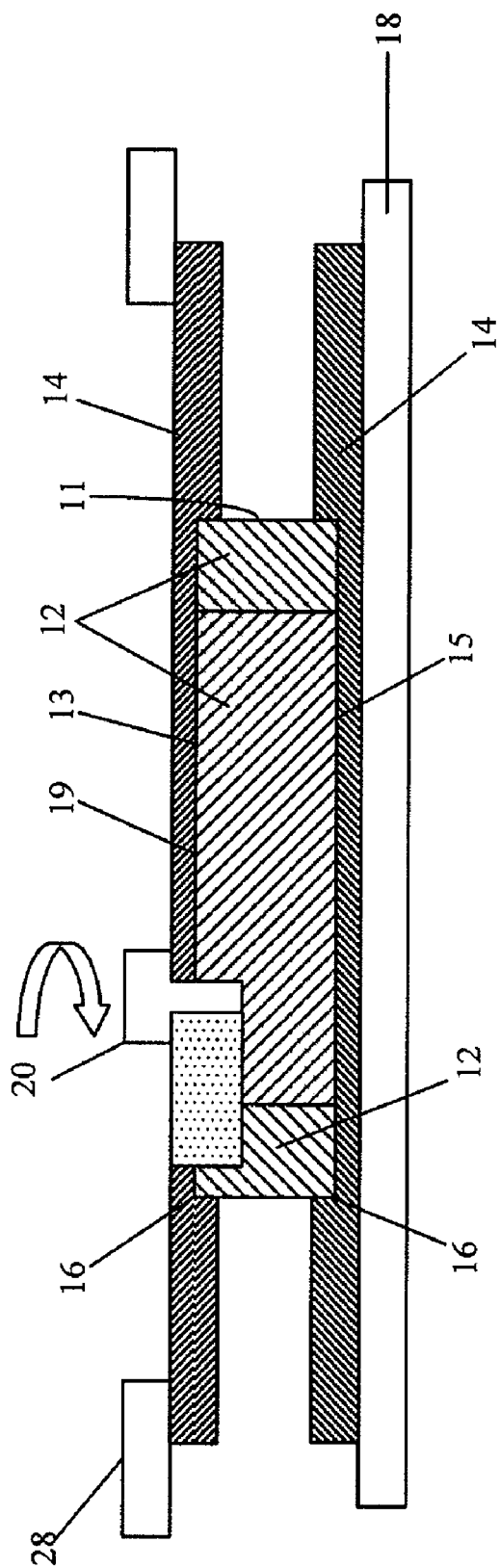
Figure 14:
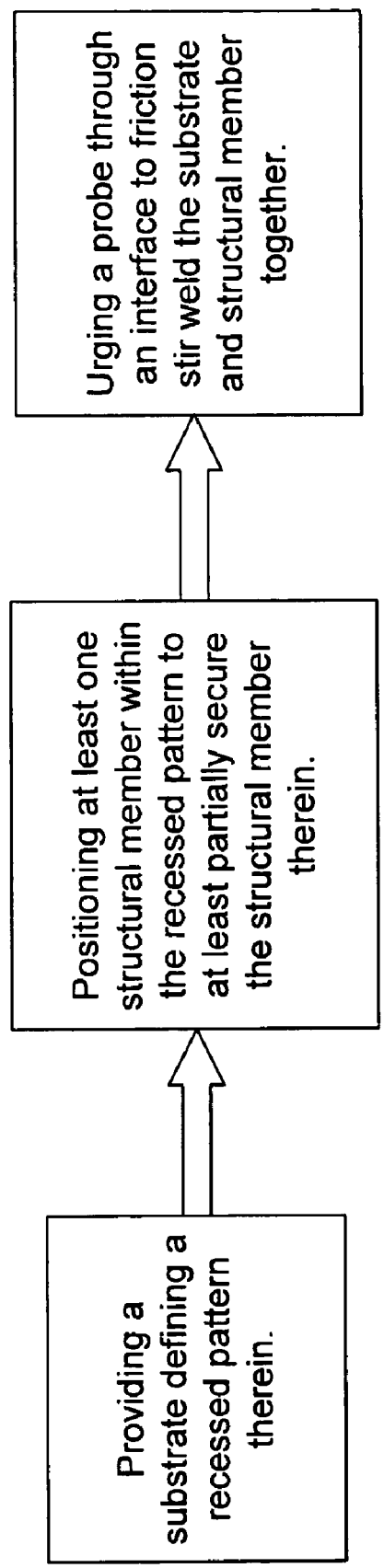

FIG. 13 is a cross-sectional view of a structural assembly for friction stir welding illustrating structural members positioned within a recessed pattern defined within a respective substrate on opposite surfaces of the structural members according to one embodiment of the present invention; and FIG. 14 is a flowchart illustrating the method for friction stir welding preforms according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
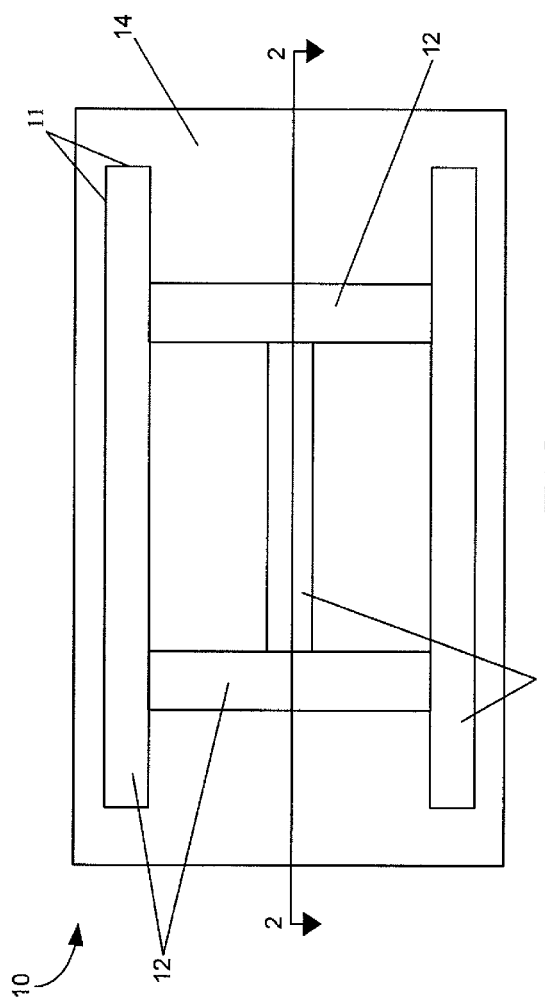
FIG. 1 is a plan view of an assembly for positioning a structural assembly for friction stir welding preforms according to one embodiment of the present invention.
Figure 2:
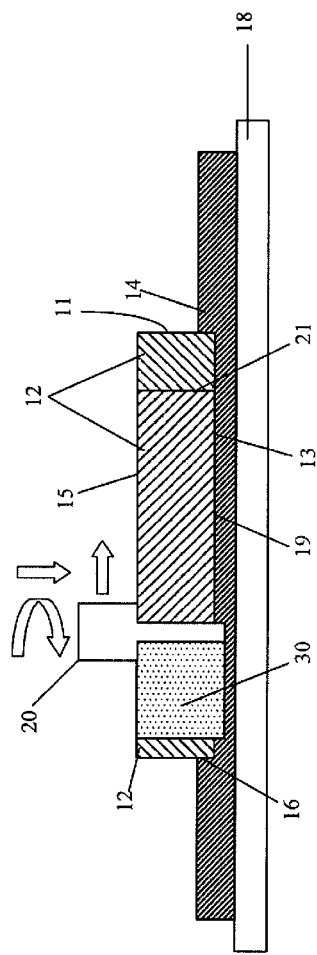
FIG. 2 is a cross-sectional view of the assembly of FIG. 1.

Referring now to the drawings and, in particular to FIGS. 1-2 there is shown a structural assembly 10 that is capable of being friction stir welded into a preform. The structural assembly 10 includes a plurality of structural members 12 arranged within a recessed pattern 16 defined within a substrate 14. The substrate 14 is positioned adjacent to the structural members 12, typically in an underlying or overlying relationship, such that a probe 20 can be used to friction stir weld the structural members and substrate together into a preform. A preform is generally an assembly of multiple structural members 12 that approximates the desired finished shape of a part, and which can be machined or otherwise trimmed to the finished shape. The term "preform" is not meant to be limiting, as there could be any number and configuration of structural members 12 that are welded to the substrate 14, including a single structural member and a substrate. In addition, the preform could be at least two structural members 12 friction stir welded together without including a substrate 14, such as when the recessed pattern is defined in a machine bed 18.

Figure 6:
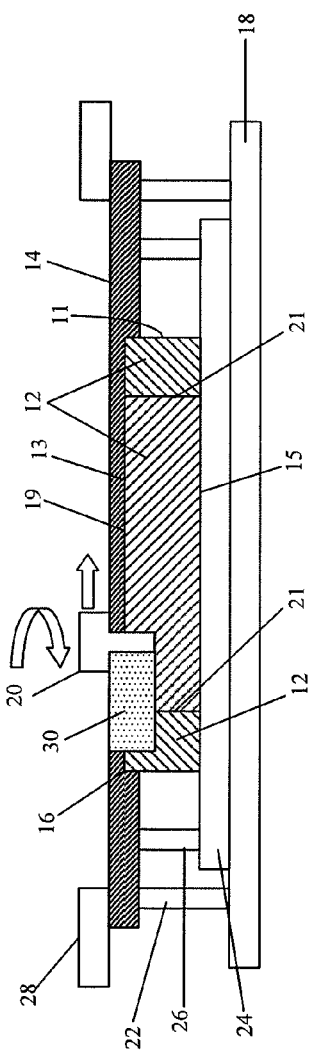
FIG. 6 is a cross-sectional view of the assembly shown in FIG. 5.

Generally, at least one structural member 12 is positioned in an overlapping configuration with the substrate 14 to define an interface 19 therebetween that can be welded to form a joint weld. A lap joint generally extends substantially perpendicular to the interface 19, through one of the structural members 12, through the interface, and at least partially through the substrate 14, as shown in FIG. 2. Similarly, the lap joint could extend through the substrate 14 and interface 19 and at least partially into the structural members 12, as illustrated in FIG. 6. Alternatively, other types of joints can similarly be formed. For example, a butt joint can be formed by abutting the edge surfaces of the structural members 12 and welding along an interface 21 defined by the abutting surfaces. The structural members 12 can also be positioned and welded in other configurations, for forming both lap and butt joints, and any number of structural members can be joined together or joined to the substrate 14.

The structural members 12 and substrate 14 can be formed of a variety of materials including, but not limited to, aluminum, aluminum alloys, titanium, titanium alloys, steel, and the like. Further, the preform can include structural members 12 and substrates 14 of similar or dissimilar materials, for example, structural members formed of different alloys of a base metal, including alloys that are unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits structural members 12 and substrates 14 formed of unweldable materials to be securely joined. Friction stir welding also can be used to securely join weldable materials to other weldable and to unweldable materials. Thus, the materials that form the preform can be chosen from a wider variety of lightweight, high strength metals and alloys, thereby facilitating reduction of the overall weight of the preform and a finished part formed therefrom.

The preform formed according to the methods of the present invention can be used in a variety of applications, including, for example, frames, panels, skins, airfoils, and the like for aeronautical and aerospace structures such as aircraft and spacecraft, for marine vehicles, automobiles, and the like, as well as for other applications outside of the transportation industry. The friction stir weld joints can be used for joining large preforms having a variety of geometries. The preforms should approximate the desired dimensions and configuration of the final part to reduce the machining time required, as well as reduce waste material.

As shown in FIG. 1, a plurality of structural members 12 are arranged on a substrate 14. FIG. 2 demonstrates that the structural members 12 fit within a recessed pattern 16 defined in the substrate 14 to define an interface 19 between the structural members and the substrate. A probe 20 is inserted through a structural member 12 and interface 19 into the underlying substrate 14. As shown in FIG. 6, the probe 20 may also be inserted from the opposite direction such that the probe extends through the substrate 14 and interface 19 and into the underlying structural members 12. The probe 20 may be inserted substantially perpendicular to the interface 19, although it is understood that "substantially perpendicular" is not meant to be limiting and could include extending the probe perpendicular or tilting the probe at a small angle (e.g., 0 to 3 degrees) relative to the substrate 14 and structural member 12. The probe 20, which is made of a harder material than either the substrate 14 or structural member 12, rotates as it is translated to generate frictional heat within the substrate and structural member to at least partially plasticize the substrate and structural member. Upon cooling of the plasticized region 30, the substrate 14 and structural member 12 are joined along the resulting weld joint. Friction stir welding is further described in U.S. Pat. No. 5,460,317 to Thomas et al., the entire content of which is incorporated herein by reference.

The structural members 12 are arranged within the recessed pattern 16 defined by the substrate 14 such that the structural members are at least partially secured to the substrate during friction stir welding. For example, as shown in FIGS. 1 and 2, each structural member 12 includes an outer periphery 11 and first 13 and second 15 opposing surfaces. As shown in FIG. 2, substantially all of the first surface 13 is configured to lie adjacent to the substrate 14, and a portion of the outer periphery 11 may be configured to extend perpendicularly and partially within the recessed pattern. The recessed pattern 16 is typically sized to snugly receive the structural members 12, thereby preventing movement of the structural members 12 in a direction substantially parallel to the interface 19, although the recessed pattern could be configured to prevent movement in a non-parallel plane (e.g., a rounded or v-shaped interface). The recessed pattern 16 substantially corresponds to the outer periphery 11 of the structural members such that a width and length of the structural members 12 substantially correspond to the configuration of the recessed pattern, and the structural members extend partially within the substrate 12 to a predetermined depth. In one embodiment, the predetermined depth could be approximately 0.030 to 0.125 inches. Thus, a separate clamp is not required to secure each structural member 12 during friction stir welding since the structural members are engaged within the recess. The structural members 12 can be arranged in any desired configuration within the recessed pattern 16, and consequently, the recessed pattern could be any desired dimension and shape to accommodate the structural members. The structural members 12 shown in FIGS. 1, 3, 5 and 7 are rectangular solids (i.e., the outer periphery 11 includes four planar sides and the opposing surfaces 13, 15 are planar), although any geometry of structural members could be employed with a corresponding recessed pattern 16 according to additional embodiments of the present invention. The recessed pattern 16 may be formed in the substrate 14 or machine bed 18 using any number of machining or casting techniques, as known to those skilled in the art, as well as forming the recessed pattern in the structural member with friction stir welding, which will be described in more detail below.

As used herein, the recessed pattern 16 is described as being configured to "substantially correspond" to the structural members 12 to at least partially secure the structural members relative to one another and to the substrate 14. The phrase "substantially correspond" is not meant to be limiting, and the structural members 12 and substrate 14 are typically secured such that there is minimal movement of the structural members within the recessed pattern 16 during friction stir welding. As such, the recessed pattern 16 is configured to have close tolerances between the structural members 12 and the substrate 14. For example, in one embodiment, the tolerances are approximately 0.060 inches. Thus, the recessed pattern 16 may allow for some movement of the structural members 12 when positioned within the recessed pattern, and the addition of the force of the probe 20 substantially perpendicular to the interface 19 acts to further secure the structural members within the recessed pattern.

The recessed pattern 16 may be of any configuration for accommodating various structural members 12 and substrates 14. Thus, although FIG. 1 shows five individual structural members 12, it is possible to have any number, size, and combination of structural members positioned within the recessed pattern 16. Furthermore, although the probe 20 is illustrated as penetrating an interface 19 that extends in a substantially horizontal plane, it is understood that the assembly could be oriented in a variety of positions. For example, the interface 19 could extend in a vertical plane, and the probe 20 could employ a 90-degree weld head that is capable of friction stir welding along the interface to form a lap joint.

Figure 3:
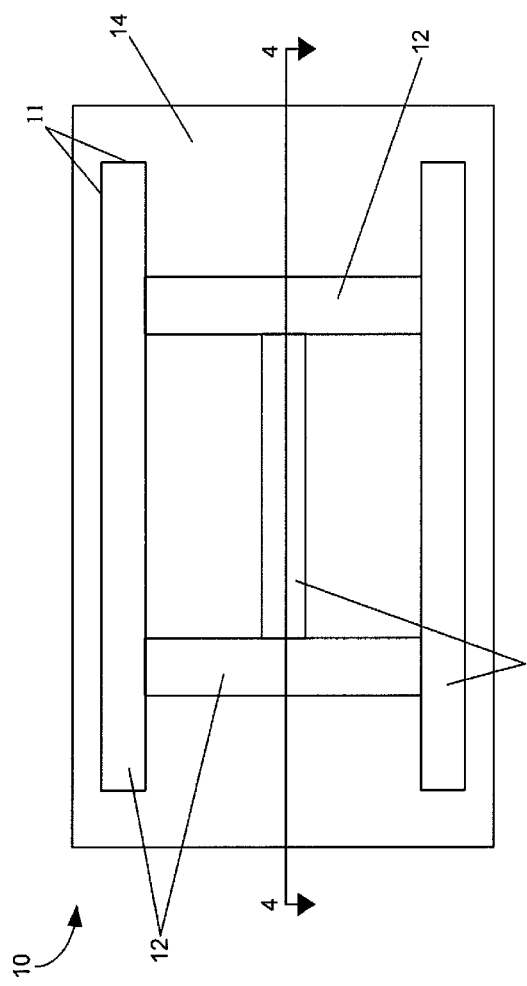
FIG. 3 is a plan view of an assembly for positioning a structural assembly for friction stir welding preforms according to another embodiment of the present invention.
Figure 4:
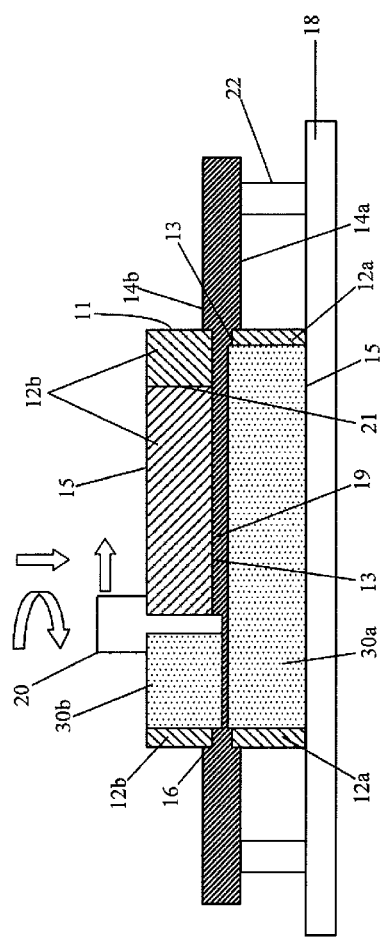
FIG. 4 is a cross-sectional view of the assembly of FIG. 3.
Figure 5:
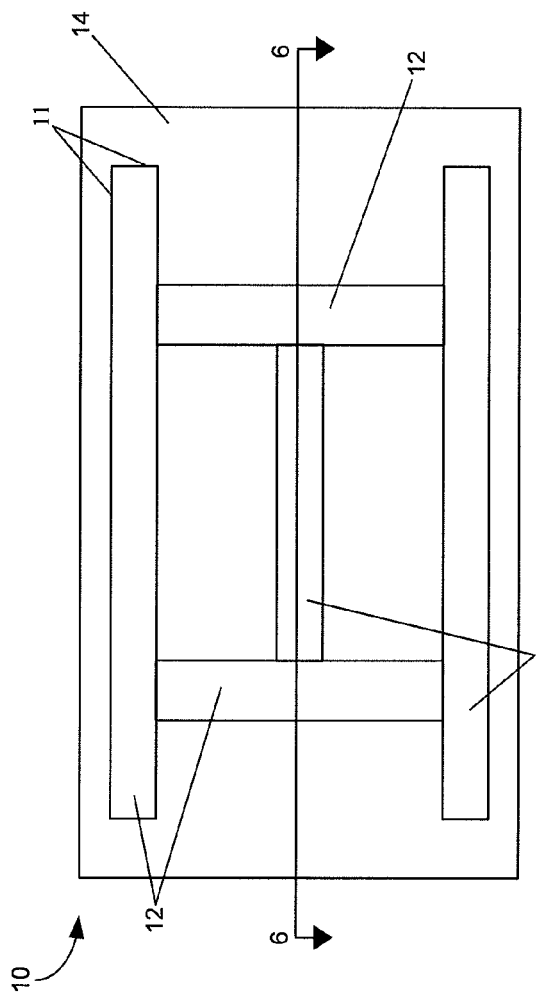
FIG. 5 is a plan view of an assembly for positioning a structural assembly for friction stir welding preforms according to yet another embodiment of the present invention.

As discussed above, the substrate 14 is positioned adjacent to the structural members 12 to define an interface 19 therebetween, and it is possible to secure the substrate to the structural member 12 during friction stir welding using a variety of techniques in addition to the recessed pattern 16. In the instance where the structural members 12 are positioned within the recessed pattern 16 as shown in FIG. 2, the addition of the force of the probe 20 substantially perpendicular to the interface 19 acts to secure the structural members within the recessed pattern. As described below, a similar technique may be employed in the instance where the substrate 14 is positioned between structural members 12, as depicted in FIGS. 3-4. Thus, a recessed pattern 16 could be defined in opposite surfaces of the substrate 12.

Alternatively, as shown in FIG. 6, the recessed pattern 16 may be defined in the substrate 14 to overlie the structural members 12 such that the structural members fit within the recessed pattern, and clamps 28 are further used to secure the substrate to the machine bed 18. Because the substrate 14 is spaced away from the machine bed 18, and a portion of the substrate is not supported by underlying structural members 12, support pins 22 may be used to support and balance the substrate during friction stir welding. The support pins 26 may be any desired configuration depending on the size and shape of the structural members 12 used, but may be easily sized and fabricated for a particular structural assembly 10. Furthermore, the support pins 26 could be cylindrical, blocks, or any other shape that is also capable of supporting the portions of the substrate 14 that do not contact the structural members 12. The support pins 26 are typically substantially perpendicular to the substrate 14 and machine bed 18, although there may be circumstances when this is not the case, such as if an angled or a rounded substrate 14 and/or machine bed 18 is used. The support pins 26 may be made from materials, such as metal.

A vacuum plate 24 could also be employed in addition to, or instead of, the clamps 28. Vacuum seals 26 extend from the vacuum plate 24 to the substrate, and a vacuum is applied through the vacuum plate to retain the substrate 14 in position relative to the structural members 12 so as to define the interface 19, as shown in FIG. 6. Typically, vacuum is applied to initially position the structural members 12 within the recessed pattern 16 prior to clamping the substrate with the clamps 28. Therefore, a variety of techniques may be used to secure the substrate 14 and structural members 12 during friction stir welding, which are efficient to set up so that adjustments may be made during progressing stages of fabricating the preform.

In a particular embodiment shown in FIG. 13, the structural members 12 are positioned within a recessed pattern 16 defined in a substrate on one surface of the structural members. Moreover, the structural members 12 are also positioned within a recessed pattern 16 defined in an additional substrate 16 on an opposite surface of the structural members. Thus, the structural members 12 and at least one substrate 14 may be friction stir welded together along one interface 19 while positioned within the recessed patterns 16 on opposite surfaces of the structural members. As depicted in FIG. 13, the probe 20 is urged through the interface 19 defined between an upper substrate 14 and the structural members 12. In this regard, the structural members 12 are secured within the recessed patterns 16 defined in a respective substrate 14, which eliminates any need for a vacuum to secure the structural members. Any number of clamps 28 may be used to further secure the structural members 12 within the recessed patterns 16.

Figure 7:
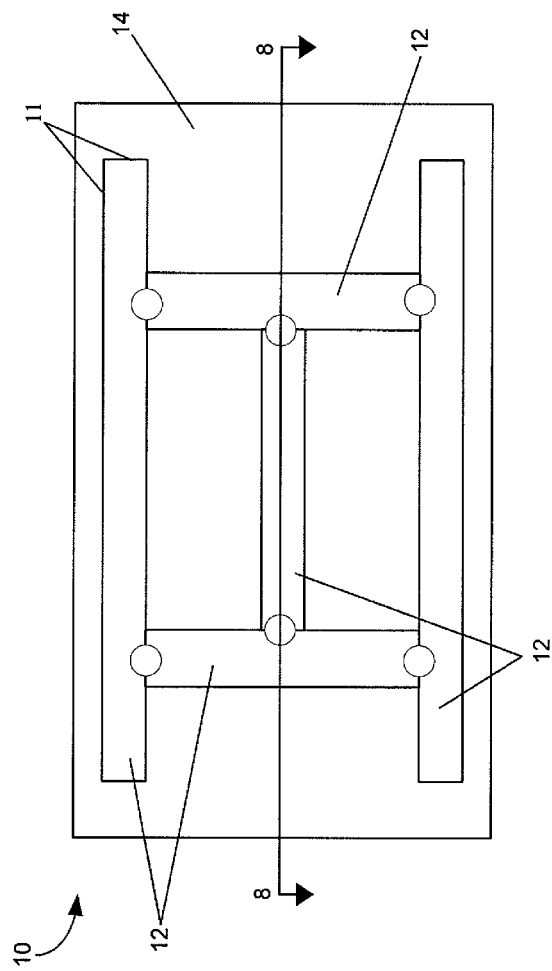
FIG. 7 is a plan view of an assembly for positioning a structural assembly for friction stir welding preforms according to another embodiment of the present invention.
Figure 8:
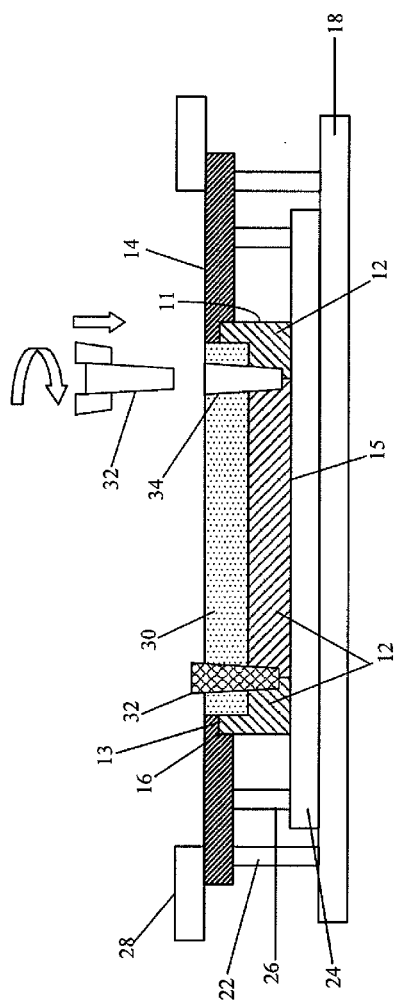
FIG. 8 is a cross-sectional view of the assembly shown in FIG. 7.

As is typical with friction stir welding the structural assembly 10 shown in FIG. 6, the structural members 12 are not fully welded at a respective interface 21. See, for example, the left most interface 21 shown in FIG. 6 in which only that portion of the interface proximate to the substrate 14 is welded, although the extent of the weld is dependent upon the depth to which the probe 20 extends. The interface 21 extending between the structural members 12 is typically substantially perpendicular to the interface 19 extending between the structural members and the substrate 14, although it is understood that each interface 19, 21 could be oriented in a variety of planes. In order to complete the interconnection between the structural members 12, a plug weld 32 may be inserted within a hole 34 defined along the interface 21 and through interface 19 to a predetermined depth that is greater than the depth created during friction stir welding, which is illustrated in FIGS. 7-8. A plug weld 32, as known to those skilled in the art, acts to further secure the structural members 12 and substrate 12 along the interface 21. Conversely, as shown in FIG. 2, a plug weld 32 is not typically required for this particular structural assembly 10 since the probe 20 fully penetrates the structural members 12 during friction stir welding. However, it is understood that plug welds 32 could be used for any structural assembly 10 configuration if desired. In addition, in the instance where the substrate 14 is not used and the recessed pattern 16 is defined in the machine bed 18, such as to form a butt joint between adjacent structural members 12, the plug weld 32 would penetrate only the interface 21 extending between the structural members and not the interface 19.

Figure 9:
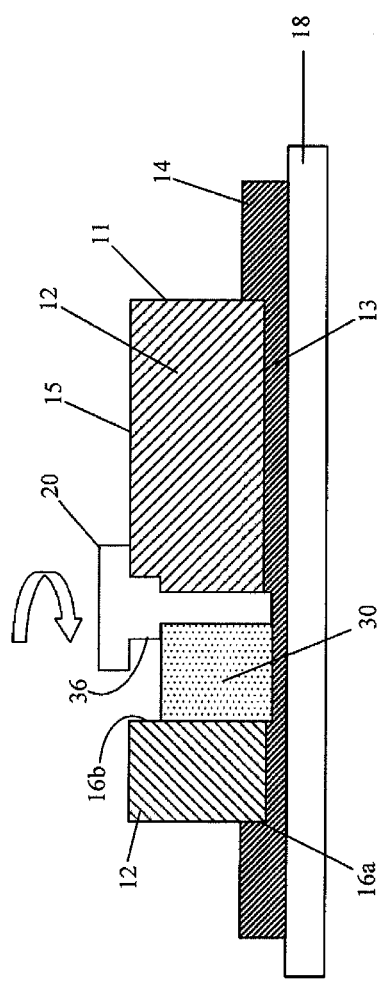
FIG. 9 is a cross-sectional view of a structural assembly for friction stir welding illustrating a probe capable of friction stir welding and forming a recess in a structural member according to one embodiment of the present invention.
Figure 10:
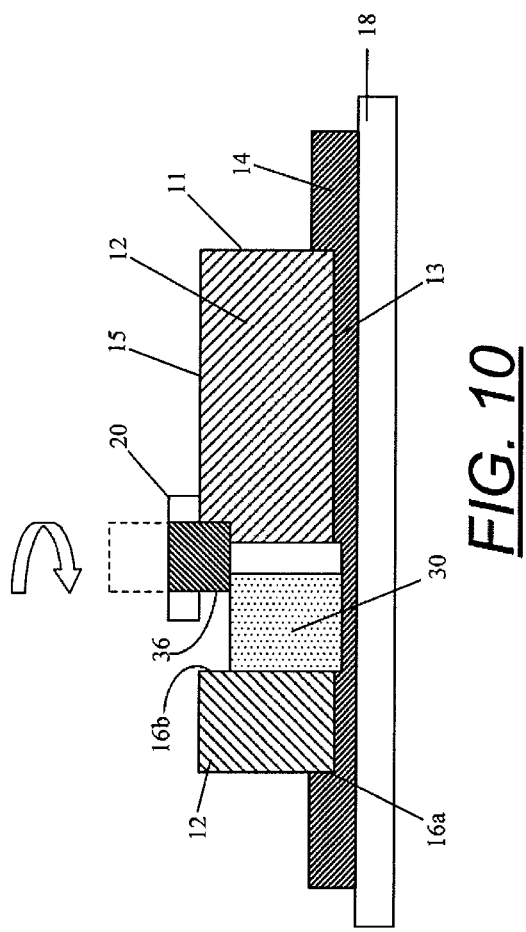
FIG. 10 is a cross-sectional view of a structural assembly for friction stir welding illustrating a probe capable of friction stir welding and forming a recessed pattern in a structural member according to another embodiment of the present invention.

In an additional embodiment of the present invention illustrated in FIGS. 9 and 10, the probe 20 may include a shoulder 36 that extends to a predetermined depth within the structural member 12 to create a recessed pattern 16b formed in a surface opposite of the surface being friction stir welded to the substrate 14. As such, the probe 20 may simultaneously friction stir weld the structural member 12 to the substrate 14, while also forming a recessed pattern 16b in an opposite surface. Consequently, as shown in FIG. 11, additional structural members 12b may be positioned within the recessed pattern 16b and thus stacked on the structural members 12a that have previously been positioned within the recessed pattern 16a and friction stir welded to the substrate 14. Moreover, the probe 20 may include a shoulder 36 that is retractable (represented by dashed lines in a retracted position in FIG. 10), such that the probe may be used to form a recessed pattern 16b in the structural members 12a, and then retracted and used to friction stir weld the structural members 12a and 12b without also forming an additional recessed pattern in structural member 12b. FIG. 12 illustrates that a substrate 14 may be positioned to overlie structural members 12 such that the probe 20 including a shoulder 36 may friction stir weld the substrate to the structural members on one surface of the substrate while also forming a recessed pattern 16b in the opposite surface of the substrate. In this regard, additional structural members 12 may be positioned within the recessed pattern 16b and friction stir welded to the substrate 14.

However, it is understood that it may be desirable to form more than two layers of structural members 12 such that the shoulder 36 forms a recessed pattern in each of the additional layers of structural members. In this regard, the shoulder 36 is not retractable, or is simply not retracted prior to friction stir welding the stack of structural members together. It is also understood that a substrate 14 could be friction stir welded to the structural members 12b, and that additional structural members could be friction stir welded to the substrate to form a variety of arrangements of stacks of structural members and substrates in alternative embodiments.

Different techniques may be used to friction stir weld the structural members 12 and substrate 14 together. For instance, the flowchart shown in FIG. 14 demonstrates a method for friction stir welding preforms according to one embodiment of the present invention. The substrate 14, defining a recessed pattern 16 therein, is generally positioned on an underlying machine bed 18. As shown in FIG. 1, the structural members 12 are positioned within the recessed pattern 16 to partially secure the structural members within the recessed pattern. An interface 19 is defined between the substrate 14 and the structural members 12. The rotating probe 20 is then urged within the structural member 12, through the interface 19, and into the underlying substrate 14. The probe 20 is translated through the substrate 14 and structural member 12 as the probe is rotating to friction stir weld the substrate and structural member together. The force is applied substantially perpendicular to the interface 19 during friction stir welding, which ensures that the structural members 12 are adequately secured within the recessed pattern 16. In this configuration a lap joint, as described above, may be formed between the substrate 14 and each of the structural members 12. Alternatively, as shown in FIG. 6, the probe 20 may be inserted through the substrate 14 and interface 19 and into the underlying structural members 12 to friction stir weld the structural members and substrate together. In this instance, a vacuum plate 24 may be used to temporarily hold the substrate 14 adjacent to the structural members 12 prior to clamping the substrate. In addition, support pins 26 are typically placed between the substrate 14 and machine bed 18 to ensure that the substrate is properly balanced during friction stir welding. However, as discussed above with respect to FIG. 13, a pair of substrates 14 defining respective recessed patterns 16 may be employed such that a vacuum plate 24 and/or support pins 26 not required.

Additionally, FIG. 4 illustrates that a second layer of structural members 12b may be friction stir welded to the opposite surface 14b of the substrate to create a second plasticized region 30b by first friction stir welding the structural members 12a on a first surface 14a of the substrate to the substrate to create a first plasticized region 30a and then turning the substrate over and repeating the steps outlined above for FIG. 2 to friction stir weld the structural members on the opposite surface of the substrate to the substrate to form the preform. The substrate 14 may be secured by clamps 28 to the machine bed 18, or a vacuum plate 24 and seals 26 may be used in place of, or in combination with, the clamps 28. Furthermore, a second layer of structural members 12 may be friction stir welded to the structural assembly 10 shown in FIGS. 6 and 13 by stacking a second layer of structural members 12 within a recessed pattern 16 defined in an opposite surface of the substrate 14 that has been friction stir welded and then urging the probe 20 through the structural members 12 and interface 19 and into the underlying substrate.

The recessed pattern 16 could be formed in the opposite surface of the substrate 14 either before or after friction stir welding the first surface. If the recessed pattern 16 is formed in the opposite surface of the substrate 14 prior to welding the structural members 12 to the first surface with respect to the structural assembly 10 shown in FIG. 6, the second layer of structural members may be readily placed in the recessed pattern defined in the opposite surface of the substrate. In an additional embodiment, the recessed pattern 16 may be formed in the opposite surface of the substrate 14 after welding the structural members 12 to the first surface of the substrate, which promotes closer tolerances and eliminates a second set-up step when machining the recessed patterns in the first surface of the substrate, as the machining could be performed while the structural assembly 10 is positioned on the machine bed 18.

As described above with reference to FIGS. 9-11, a second layer of structural members 12b may be friction stir welded to the structural members 12a previously welded to the substrate 14. In particular, a probe 20 having a shoulder 36 extending therefrom is urged through the structural members 12a and into the underlying substrate 14 to create a first plasticized region 30a. During friction stir welding, the shoulder 36 forms a recessed pattern 16b in an opposite surface of the structural members 12b that is being friction stir welded to the substrate 14. A second layer of structural members 12b is then placed within the recessed pattern 16b defined in the structural members 12a, and the probe is urged through the second layer of structural members 12b and into the underlying structural members 12a to form a second plasticized region 30b to friction stir weld the structural assembly together. Furthermore, a probe 20 having a shoulder 36 extending therefrom could also be employed with the structural assembly 10 shown in FIG. 13. Thus, the probe 20 and shoulder 36 could form a recessed pattern 16 such as that shown in FIG. 12 but without requiring a vacuum to secure the structural members within the substrate 14 adjacent to the machine bed 18.

It is understood that various friction stir welding techniques may be employed with the present invention in alternative embodiments. Although the techniques described above are directed to forming lap joints, it is understood that butt or other joints may also be formed in additional embodiments of the present invention. For example, the structural members 12 may be friction stir welded together without employing a substrate 14. In this configuration, the structural members 12 could be joined with lap or butt joints, while being positioned within a recessed pattern 16 defined in the machine bed 18. In addition, it is understood that the interfaces 19, 21 may be defined between a portion of both the structural members 12 and substrate 14, such that a combination of lap and butt joints may be formed.

Once the preform is created, a predetermined amount of excess material can be machined from the preform to form the machined structural assembly 10. The machining process can be performed by any known means, including using a manual or computer-guided machining device, such as a CNC machine. Advantageously, because the preforms closely or substantially approximate the predetermined dimensions and configuration of the corresponding machined structural assembly 10, the amount of machining is relatively small compared to, for example, the amount of machining that would be required to machine structural assemblies from solid blocks of material.

The present invention therefore provides a structural assembly 10 that is capable of arranging structural members 12 in a variety of configurations prior to friction stir welding. The structural assembly 10 eliminates separate tooling for clamping each of the structural members 12 prior to friction stir welding, which consequently reduces the cost of friction stir welding preforms. The recessed pattern 16, in combination with force applied by the probe 20, is capable of adequately securing the structural members 12 during friction stir welding. Furthermore, the structural assembly 10 is capable of positioning the structural members 10 for fabricating a variety of preforms that may later be machined into a finished part.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An assembly for positioning a structural assembly for friction stir welding, comprising:

a substrate having an outer periphery and a recessed pattern defined therein, wherein outer periphery completely surrounds the recessed pattern and the recessed pattern is spaced away from the outer periphery; and at least one structural member positioned within the recessed pattern to at least partially secure the structural member therein, wherein the structural member includes an outer periphery substantially corresponding to at least a portion of the recessed pattern and first and second opposing surfaces extending therebetween, wherein the first and second opposing surfaces extend substantially parallel to one another and the outer periphery extends substantially perpendicular to the first surface, and wherein the entire first surface extending between the periphery is configured to lie in direct contact with the substrate and within the recessed pattern to define an interface therebetween such that the substrate and structural member are configured to be friction stir welded together along at least a portion of the interface.

2. The assembly according to claim 1, wherein the recessed pattern substantially corresponds to a width and a length of the first surface of the structural member and extends partially within the substrate to a predetermined depth.

3. The assembly according to claim 1, wherein the substrate includes a first surface and a second surface opposite the first surface, and wherein the recessed pattern is defined in the first surface.

4. The assembly according to claim 3, wherein a recessed pattern is defined in each of the first and second surfaces of the substrate.

5. The assembly according to claim 4, further comprising at least one structural member positioned within the recessed pattern defined in the second surface.

6. The assembly according to claim 1, further comprising at least one support pin positioned adjacent and substantially perpendicular to the substrate at a location other than the interface, wherein the at least one support pin is configured to support the substrate such that a friction stir welding probe is configured to be urged into the substrate, through the interface, and then into the at least one structural member.

7. The assembly according to claim 1, wherein a plurality of structural members are positioned adjacent to, and in direct contact with, one another within the recessed pattern to define an interface therebetween, and wherein the interface defined between the structural members and the substrate is substantially perpendicular to the interface defined between the structural members.

8. The assembly according to claim 7, further comprising at least one plug weld positioned within a respective hole defined along the interface between the structural members and through the interface defined between the structural members and the substrate.

9. The assembly according to claim 1, further comprising a vacuum source that is capable of drawing a vacuum through a vacuum plate to secure the substrate to the structural member.

10. The assembly according to claim 1, wherein the substrate is positioned adjacent to the structural member such that at least one of a lap and butt joint is capable of being formed.

11. The assembly according to claim 7, wherein the plurality of structural members are positioned adjacent to one another such that a portion of the periphery of adjacent structural members are positioned adjacent to, and in direct contact with, one another.

12. The assembly according to claim 1, wherein the first and second opposing surfaces of the at least one structural member are planar.

13. The assembly according to claim 1, wherein the at least one structural member is rectangular taken along a cross section substantially parallel to the first surface such that the periphery comprises four sides.

14. The assembly according to claim 3, wherein the periphery of the at least one structural member is substantially perpendicular to the first and second opposing surfaces of the structural member and is configured to extend partially within, and perpendicular to, the substrate such that a remaining portion of the periphery extends outwardly from the first surface of the substrate.

15. The assembly according to claim 7, wherein the plurality of structural members share the same interface with the substrate.

16. The assembly according to claim 15, wherein the interface defined between the plurality of structural members and the substrate is substantially planar.

17. The assembly according to claim 7, wherein each structural member is positioned adjacent to, and in direct contact with, at least two other structural members.

* * * * *